United States Patent
Lichtensteiger et al.

(10) Patent No.: US 8,239,791 B2
(45) Date of Patent: Aug. 7, 2012

(54) METHOD OF DESIGNING MULTI-STATE RESTORE CIRCUITRY FOR RESTORING STATE TO A POWER MANAGED FUNCTIONAL BLOCK

(75) Inventors: Susan K. Lichtensteiger, Essex Junction, VT (US); Michael R. Ouellette, Westford, VT (US); Raymond W. M. Schuppe, South Burlington, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/135,250

(22) Filed: Jun. 9, 2008

(65) Prior Publication Data

US 2009/0307637 A1    Dec. 10, 2009

(51) Int. Cl.
G06F 17/50    (2006.01)
(52) U.S. Cl. ........ 716/100; 716/106; 716/107; 716/108; 716/109; 716/113; 716/120; 716/132; 716/133; 716/134; 716/136
(58) Field of Classification Search .......... 716/100–113, 716/120, 132–136
See application file for complete search history.

(56) References Cited

U.S. PATENT DOCUMENTS

| | | | |
|---|---|---|---|
| 4,937,770 A | 6/1990 | Samuels et al. | |
| 5,995,420 A | 11/1999 | Hesley | |
| 6,553,556 B1 | 4/2003 | Blodgett | |
| 6,781,437 B2 | 8/2004 | Ma | |
| 2002/0144185 A1* | 10/2002 | Farago et al. | 714/42 |
| 2003/0036893 A1 | 2/2003 | Chen | |
| 2003/0046053 A1 | 3/2003 | Wheeler et al. | |
| 2003/0131336 A1 | 7/2003 | Blodgett | |
| 2004/0215435 A1 | 10/2004 | Hunt et al. | |
| 2007/0284619 A1* | 12/2007 | Kanno et al. | 257/207 |

(Continued)

FOREIGN PATENT DOCUMENTS

JP    5314204    11/1993

OTHER PUBLICATIONS

Response to Office Action dated Feb. 19, 2010, with regard to related U.S. Appl. No. 12/135,249, filed Jun. 9, 2008, entitled "Integrated Circuit Containing Multi-State Restore Circuitry for Restoring State to a Power-Managed Functional Block," Susan K. Lichtensteiger et al.

(Continued)

*Primary Examiner* — Paul Dinh
(74) *Attorney, Agent, or Firm* — Downs Rachlin Martin PLLC (57) ABSTRACT

Methods of designing and testing restore logic for restoring values to storage elements of power-managed logic circuitry. In one implementation, a design method disclosed includes providing a design of the logic circuitry that, when instantiated, will have a number of states it can be returned to upon repowering-up the logic circuitry. Values held by the storage elements are determined and utilized to categorize the storage elements into categories that allow the development of restore logic that will restore the state of the power-managed logic circuitry that is appropriate to the particular powering-up. The restore logic design is tested by modeling it and the power-managed logic circuitry in a hardware description language and simulating the number of states over a number of test cases. If the design and testing are successful, the restore logic can be optimized for instantiation into an actual integrated circuit.

20 Claims, 6 Drawing Sheets

U.S. PATENT DOCUMENTS

2008/0098339 A1* 4/2008 Chan .................................. 716/6
2009/0204924 A1* 8/2009 West et al. .................... 715/772

OTHER PUBLICATIONS

Notice of Allowance dated Jun. 14, 2010, with regard to related U.S. Appl. No. 12/135,249, filed Jun. 9, 2008, entitled "Integrated Circuit Containing Multi-State Restore Circuitry for Restoring State to a Power-Managed Functional Block," Susan K. Lichtensteiger et al.

First Office Action dated Nov. 14, 2009, with regard to related U.S. Appl. No. 12/135,249, filed Jun. 9, 2008, entitled Integrated Circuit Containing Multi-State Restore Circuitry for Restoring State to a Power-Managed Functional Block, Susan K. Lichtensteiger et al.

* cited by examiner

METHOD OF DESIGNING MULTI-STATE RESTORE CIRCUITRY FOR RESTORING STATE TO A POWER MANAGED FUNCTIONAL BLOCK

RELATED APPLICATION DATA

The present application relates to co-pending U.S. application Ser. No. 12/135,249, filed on Jun. 9, 2008, and titled "Integrated Circuit Containing Multi-State Restore Circuitry for Restoring State to a Power-Managed Functional Block," which is incorporated herein by reference in its entirety.

FIELD OF THE INVENTION

The present invention generally relates to the field of integrated circuits. In particular, the present invention is directed to an integrated circuit containing multi-state restore circuitry for restoring state to a power-managed functional block.

BACKGROUND OF THE INVENTION

Power consumption of electronic devices that include integrated circuitry is increasingly becoming an important issue for any one or more of a number of reasons. For example, as the operating speeds of integrated circuits (ICs) continually increase, in general so, too, do the power requirements for these circuits, since power consumption varies in direct relation to the operating speed. In addition, as each new generation of technology brings a decrease in feature size and an increase in integration scale, power consumption of ICs generally increases due to the sheer presence of many more circuit elements, e.g., transistors and the like. Furthermore, with the increasing integration scale, electronic devices are capable of supporting more and more features. Power consumption typically increases with greater numbers of features, particularly when a feature requires circuitry that would not be needed in the absence of that feature. Moreover, with decreasing feature sizes comes an increasing amount of leakage current. For example, while fabrication technologies of only a short time ago resulted in leakage current on the order of only a few percent, current fabrication technologies may yield current leakage rates of 30% to 40% or more of total power There are a number of methods for reducing power consumption of ICs. One method is to simply reduce the systemic operating voltage of the IC. While this method has the ability to significantly reduce the power consumption of ICs (e.g., reducing the operating voltage from 5V to 3.3V results in a gross power reduction of about 56%), there are practical limits to this method. Another method of reducing power consumption of ICs is to reduce the amount of logic circuitry. There are clearly practical limits to this method as well. Consequently, one, the other or both of these methods are typically used in connection with one or more power management methods that seek to reduce the power provided to portions, or "functional blocks," of ICs during periods when these blocks are not needed.

One known power-management technique is to strategically place functional blocks onto voltage islands that can be separately powered up and down only when needed. A challenge with this approach, especially when the functional blocks are relatively large and include many latches, is ensuring that the latches in a power-down functional block are in the state necessary when that functional block is powered back up. One way of handling this is to use a scan-chain method in which the states of all of the latches in a functional block to be powered down are scanned out to an off-voltage-island memory just prior to powering down. When the functional block is powered up again, the stored states are then scanned back into the latches just prior to use. A shortcoming of this approach is that there is a large overhead in the many clock cycles used up in the scanning-in and -out of the states. The greater the number of latches needed to be restored, the larger the overhead. Another way to handle the startup-state issue is to use state-saving latches for all of the latches having states that need to be restored when the functional block is re-powered-up. A drawback of this approach is that state-saving latches are much more complex than non-state-saving latches and, therefore, require much more chip real estate than non-state-saving latches.

SUMMARY OF THE INVENTION

In one implementation, the present disclosure is directed to a method of designing a separately-powerable integrated circuit (IC) functional block. The method includes providing an IC logic design that includes a plurality of storage elements; determining values held by ones of the plurality of storage elements during a powering-down of the IC logic design so as to obtain determined values; characterizing ones of the plurality of storage elements as a function of the determined values; and building a restore logic design for restoring state to ones of the plurality of storage elements as a function of the determined values.

In another implementation, the present disclosure is directed to a method of designing multi-state restore circuitry for an integrated circuit (IC) logic design that includes a plurality of storage elements and, when instantiated in an IC, is restorable to a plurality of states. The method includes determining, for each of the plurality of states, values held by ones of the plurality of storage elements during a powering-down of the IC logic design so as to obtain determined values; characterizing ones of the plurality of storage elements as a function of the determined values; and building a restore logic design for restoring state to ones of the plurality of storage elements as a function of the determined values and the plurality of states.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Related U.S. patent application Ser. No. 12/135,249 discloses examples of novel multi-state restore circuitry that can be used to efficiently restore state to a power-managed functional block, i.e., a block or other set of circuitry aboard an integrated circuit (IC) that is powered-up and -down generally only as needed by the overall IC. Whereas the '249 application is directed to the structure of such multi-state restore circuitry, the present disclosure is directed to various methods of designing and testing such circuitry. Though reference can be made to the '249 application for an understanding of examples of multi-state restore circuitry and its relationship with other components of an overall IC, for convenience an explanation of exemplary multi-state restore circuitry and physical context for this circuitry is repeated herein before describing examples of methods for designing and testing such circuitry.

Figure 1:
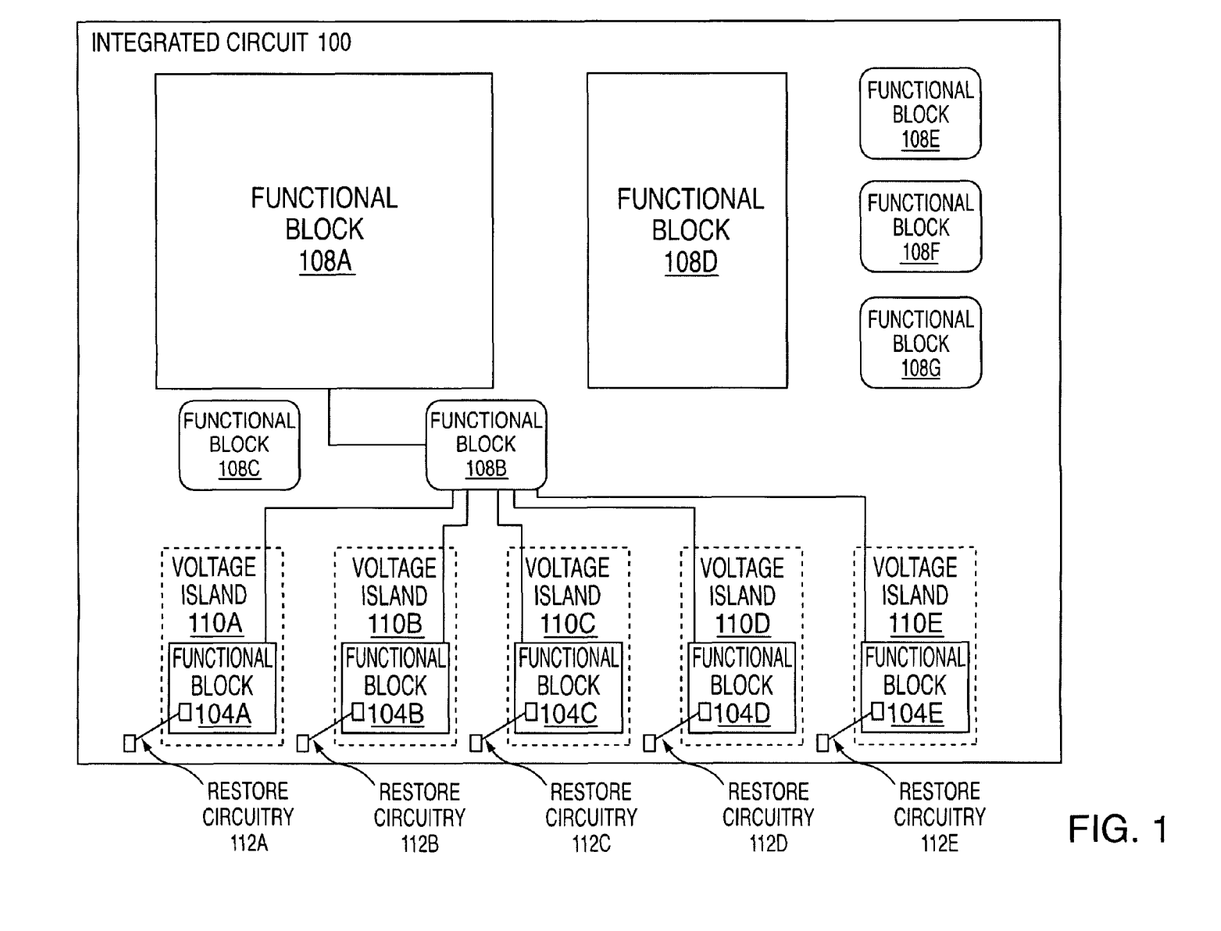
FIG. 1 is a high-level schematic diagram of an integrated circuit of the present invention that includes separately powerable functional blocks having state-restoring circuitry.

Referring now to the drawings, FIG. 1 illustrates at a high level an integrated circuit (IC) 100 that includes a number of functional blocks 104A-E, 108A-G, some of which are able to be powered down and up based on the needs of the overall IC. In this example, functional blocks 104A-E are of a "separately powerable" type and functional blocks 108A-G are of an "always-on" type. In the context of this disclosure, "separately powerable" means that when IC 100 is functioning, separately powerable functional blocks 104A-E are able to be powered up and down individually according to the needs of the IC, while always-on functional blocks 108A-G remain powered continuously as long as the IC is powered. As those skilled in the art will readily appreciate, the type and character of functional blocks 104A-E, 108A-G will vary depending on the purpose of overall integrated circuit 100. Examples of always-on functional blocks that may be functional blocks 108A-G include central processing core (108A), power management block (108B), clock management unit, and interrupt controller. Examples of separately powerable functional block that may be functional block 104A-E include floating point units, multiplier units, bus controllers and memory controllers, among others. Of course, those skilled in the art will readily appreciate that these examples are by no means limiting because of the flexibility a designer has in laying out circuitry. In this example, power management block 108B has the function of controlling the powered-up and -down states of separately powerable functional blocks 104A-E as a function of the needs of overall IC 100. General power management techniques that may be implemented by power management block 108B are disclosed in U.S. Pat. No. 6,720,673 titled "Voltage Island Fencing" and U.S. Pat. No. 7,275,164 titled "System And Method For Fencing Any One Of A Plurality Of Voltage Islands Using A Lookup Table Including AC And DC Components For Each Functional Block Of The Voltage Islands," each of which is incorporated herein by reference in relevant part. Generally, these techniques utilize the concept of placing each of separately powerable functional blocks 104A-E on a corresponding voltage island 110A-E, the power to which is regulated by power management block 108B.

As described below in more detail, each of separately powerable functional blocks 104A-E in this example is unique in that it includes restore circuitry 112A-E that restores the states of ones of the latches (not shown) (or, more generically, storage elements) located within that functional block upon powering up after a power-saving powering down of that block. Each restore circuitry 112A-E provides a low-overhead, power-efficient means for restoring state to the corresponding functional block 104A-E so that it is ready for operation virtually immediately upon re-powering of that functional block. Details of exemplary restore circuitry that could be used for any one of restore circuitries 112A-E are presented below.

Figure 2A:
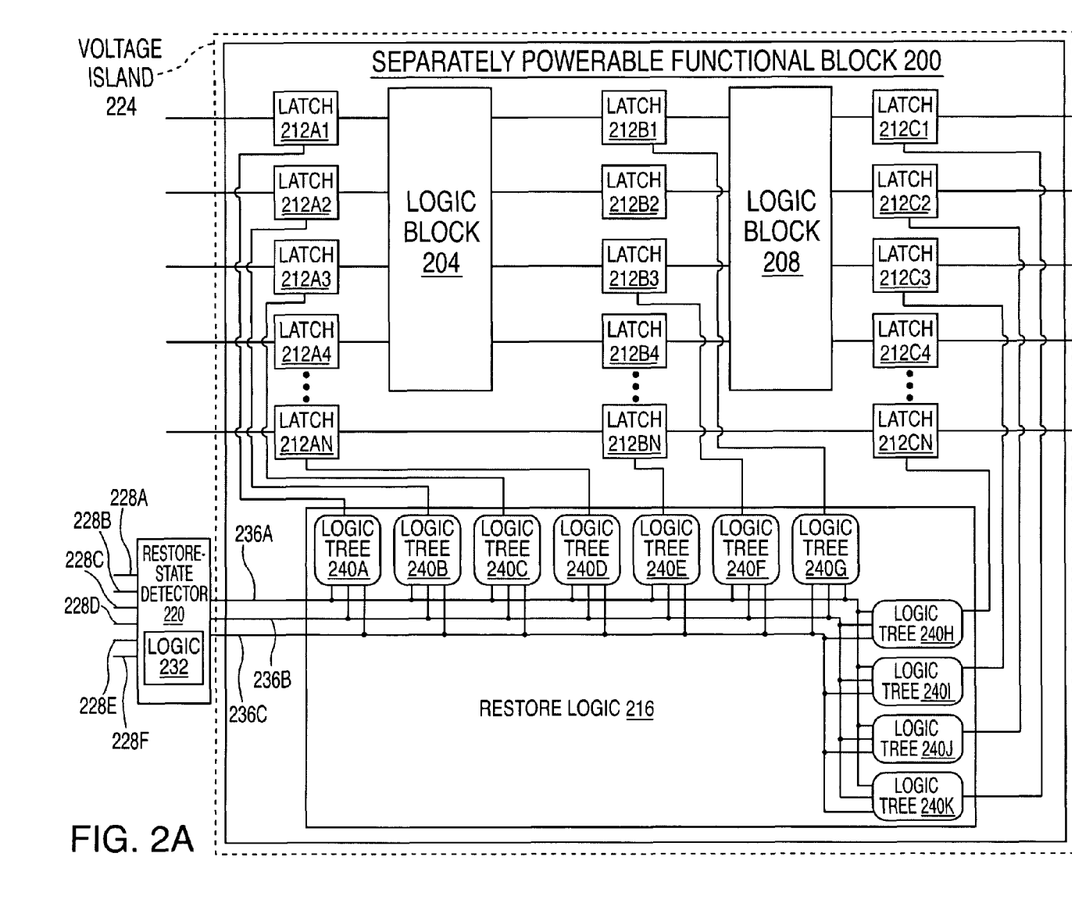
FIG. 2A is a high-level schematic diagram of a separately powerable functional block, which could be used for any one of functional blocks of FIG. 1, showing exemplary state-restoring circuitry.

FIG. 2A illustrates a separately powerable functional block 200 that is generalized such that it could be any one or more of separately powerable functional blocks 104A-E in the example IC 100 of FIG. 1. At a high level, in this example functional block 200 can be considered to include circuitry blocks, here logic blocks 204, 208, and a plurality each of: 1) input storage elements, here, latches 212A1-N; 2) intermediate storage elements, here, latches 212B1-N; and 3) output storage elements, here, latches 212C1-N. Input latches 212A1-N receive data and/or control bits from outside of functional block 200. In the context of IC 100 of FIG. 1, the data and/or control bits that input latches 212A1-N would receive could be from any one of the other functional blocks 104A-E, 108A-G, or other region of IC 100, or even from one or more other source outside of IC 100. Those skilled in the art will readily appreciate the variety of locations where data and/or control bits entering input latches 212A1-N can originate, such that further details need not be provided herein for those skilled in the art to appreciate the broad scope of the present invention. In this example, intermediate latches 212B1-N hold data and/or control bits output from logic block 204 for input to logic block 208. While intermediate latches 212B1-N may not be present in many functional block designs, they are provided in this example to demonstrate that restorable storage elements may be located virtually anywhere within a given functional block. Output latches 212C1-N hold data and/or control bits that are to be output from functional block 200.

As described below, in this example each input, intermediate, and output latch 212A1-N, 212B1-N, 212C-1-N is one of three types, i.e., "restorable," "state-saving," and "don't-care." In the present context, "don't-care" simply means that the storage element is neither restorable nor state-saving. That is, on a re-powering up, the don't-care storage elements will not have either a restored state or saved state, but rather will generally have an unknown state. However, based on the restore-state of logic blocks 204, 208 the state of the don't-care storage elements does not affect the outcome of the operation of the logic blocks. It can be beneficial to identify as many don't-care storage elements as possible, since they typically require the least amount of chip real estate to implement. In this example, only intermediate latch 212B2 is a don't-care latch and is implemented as a conventional non-state-saving latch.

State-saving ones of latches 212A1-N, 212B1-N, 212C1-N in this example are input latch 212A4, intermediate latch 212B4, and output latch 212C4. Oftentimes, though not exclusively, the state-saving storage elements are storage elements that hold data values. Since data values are inherently not a function of any state of the IC in which the data values reside they cannot be restored based on any logic that is based on the state of the IC at the time the functional block at issue, here functional block 200, is powered down. Therefore, data latches are typical candidates for implementation as conventional state-saving storage elements. In this example, each of latches 212A4, 212B4, 212C4 is a conventional state-saving latch. Those skilled in the art understand how to implement state-saving latches and other types of storage elements, such that a detailed explanation is not necessary herein for those skilled in the art to implement the present invention.

In this example, the remaining ones of input latches 212A1-N, intermediate latches 212B1-N, and output latches 212C1-N that are neither don't-care nor state-saving latches are restorable latches. Restorable latches, or more generally, storage elements, are storage elements that can have their state restored upon re-powering up of the functional block that contains the restorable storage elements, here, functional block 200. The restorable ones of the latches explicitly shown in FIG. 2A are latches 212A1-3, 212AN, 212B1, 212B3, 212BN, 212C1-3, 212CN. For implementing the restorability feature of latches 212A1-3, 212AN, 212B1, 212B3, 212BN, 212C1-3, 212CN, in this example functional block 200 is provided with restore logic 216 that is in communication with a restore-state detector 220 that is located outside of the voltage island 224 that allows functional block 200 to be separately powerable relative to any other functional blocks and other circuitry aboard the IC of which functional block 200 is a part.

As described below in greater detail, restore-state detector 220 is configured to select a restore state from among a plurality of possible restore states as a function of a plurality of input signals, here signals 228A-F. For example, an analysis of contents of all of the storage elements at issue, here input, intermediate, and output latches 212A1-N, 212B1-N, 212C1-N, for all possible operating states of the overall IC of which functional block 200 is part, relative to the powering up and down of functional block 200, may reveal that there are seven distinct restore states in which at least some of restorable latches 212A1-3, 212AN, 212B1, 212B3, 212BN, 212C1-3, 212CN must be restored to differing values. Input signal 228A-F will be those signals that are necessary for selecting among the possible restore state. Examples of such signals include, signals that indicate the operating state of other functional blocks, signals that indicate the mode(s) that the overall IC is in, and signals that indicate the function to be performed by functional block 200 upon re-powering up, among others. The selection of the proper state may be performed by selection logic 232 located within restore-state detector 220.

Figure 2B:
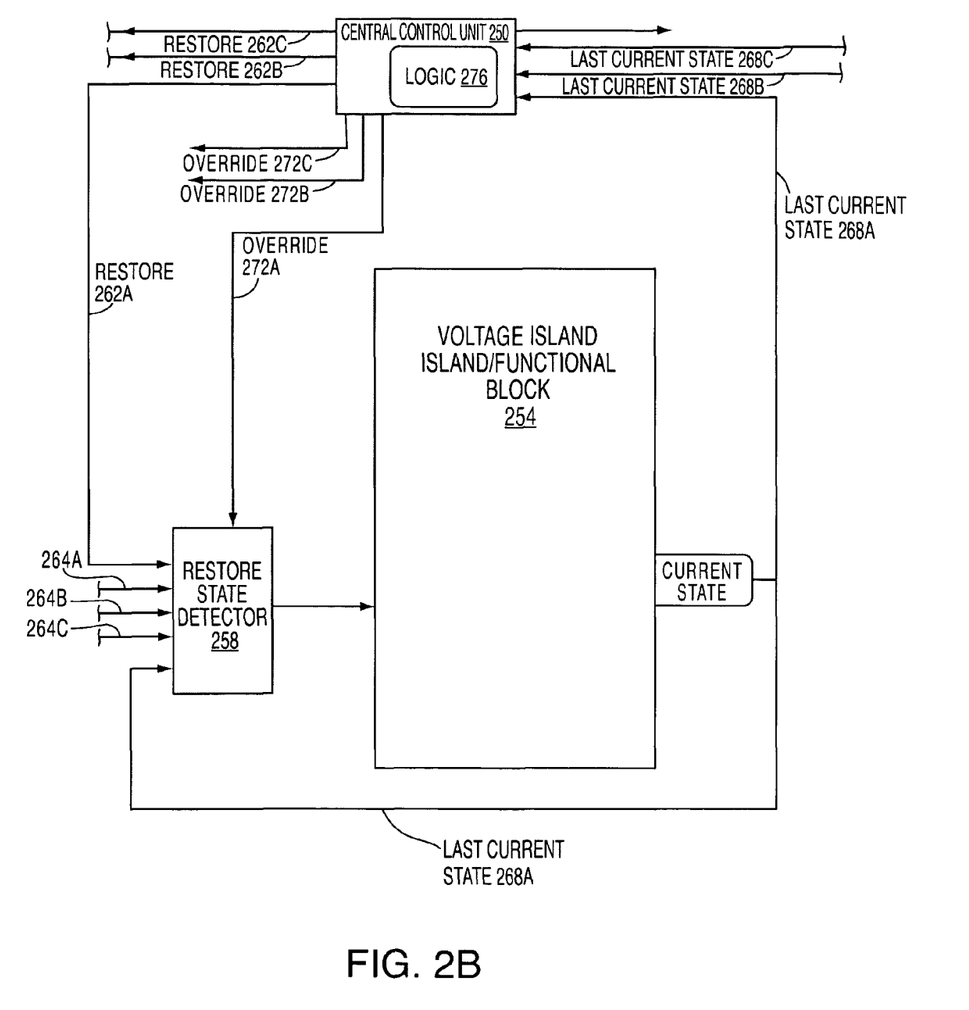
FIG. 2B is a high-level schematic diagram of a separately powerable functional block, which could be used for any one of functional blocks of FIG. 1, showing additional circuitry that can be used in conjunction with state-restoring circuitry.

To illustrate the sources of some of these signals and their usefulness, FIG. 2B contains an example of state saving circuitry that includes a central control unit 250 that can control the state-saving functionality of, for example, all separately powerable functional blocks aboard an IC chip or locate in a particular region of the chip. In this example, only single separately powerable voltage island/functional block 254 is shown for convenience. Voltage island/functional block 254 may be identical, or similar, to voltage island 224 and functional block 200 of FIG. 2A. Like the state saving circuitry of FIG. 2A, the state-saving circuitry of FIG. 2B includes a restore state detector 258 that is responsive to a plurality of inputs, in the example a restore signal 262A, control signals 264A-C, a last current state signal 268A and an override signal 272A. Restore signal 262A is generated by central control unit 250 and is used to signal restore state detector 258 that a restoration of state is proper for any particular repowering of voltage island/functional block 254. Central control unit 250 may also generate one or more like restore signals, here restore signals 262C-D, for other voltage islands/functional blocks (not shown) aboard the IC chip.

Control signals 264A-C may be signals from other functional blocks that may affect the state to which voltage island/functional block 254 is restored. Depending on the conditions of other signals, restore state detector 258 will use control signals 264A-D to determine the state to which voltage island/functional circuitry should be restored. Last current state signal feeds back to restore state detector 258 the current state of voltage island/functional block 254, as the current state may be useful in determining the state that should be restored to the functional block on the next repowering. Override signal 272A, which is generated by central control unit 250, can be used to override the normal functioning of restore state detector 258 to force a particular restore state or lack thereof, as determined by logic 276 onboard the central control unit. Central control unit 250 can base the generation of override signal 272A, and indeed any other override signals for other functional blocks, here override signals 272B-C, on any suitable input, including last current state signal 268A and last current state signals from other blocks, here last current state signals 268B-C.

Referring again to FIG. 2A, in this example the selected state is output from restore-state detector 220 to restore logic 216 on three state bit lines 236A-C. Since there are seven states, three bit lines 236A-C are used. For example, bit lines 236A-C for states "1," "2," "3," etc. may be, respectively, "100," "010," "110," etc. In this example, restore logic 216 includes a logic cone 240A-K for each one of restorable latches 212A1-3, 212AN, 212B1, 212B3, 212BN, 212C1-3, 212CN. As those skilled in the art will appreciate, each logic cone 240A-K includes a set of logic gates (not shown) selected and arranged to operate on the bit values on state bit lines 236A-C and provide the desired state to the corresponding one of restorable latches 212A1-3, 212AN, 212B1, 212B3, 212BN, 212C1-3, 212CN as a function of the selected stated provide by restore-state detector 220.

Figure 3A:
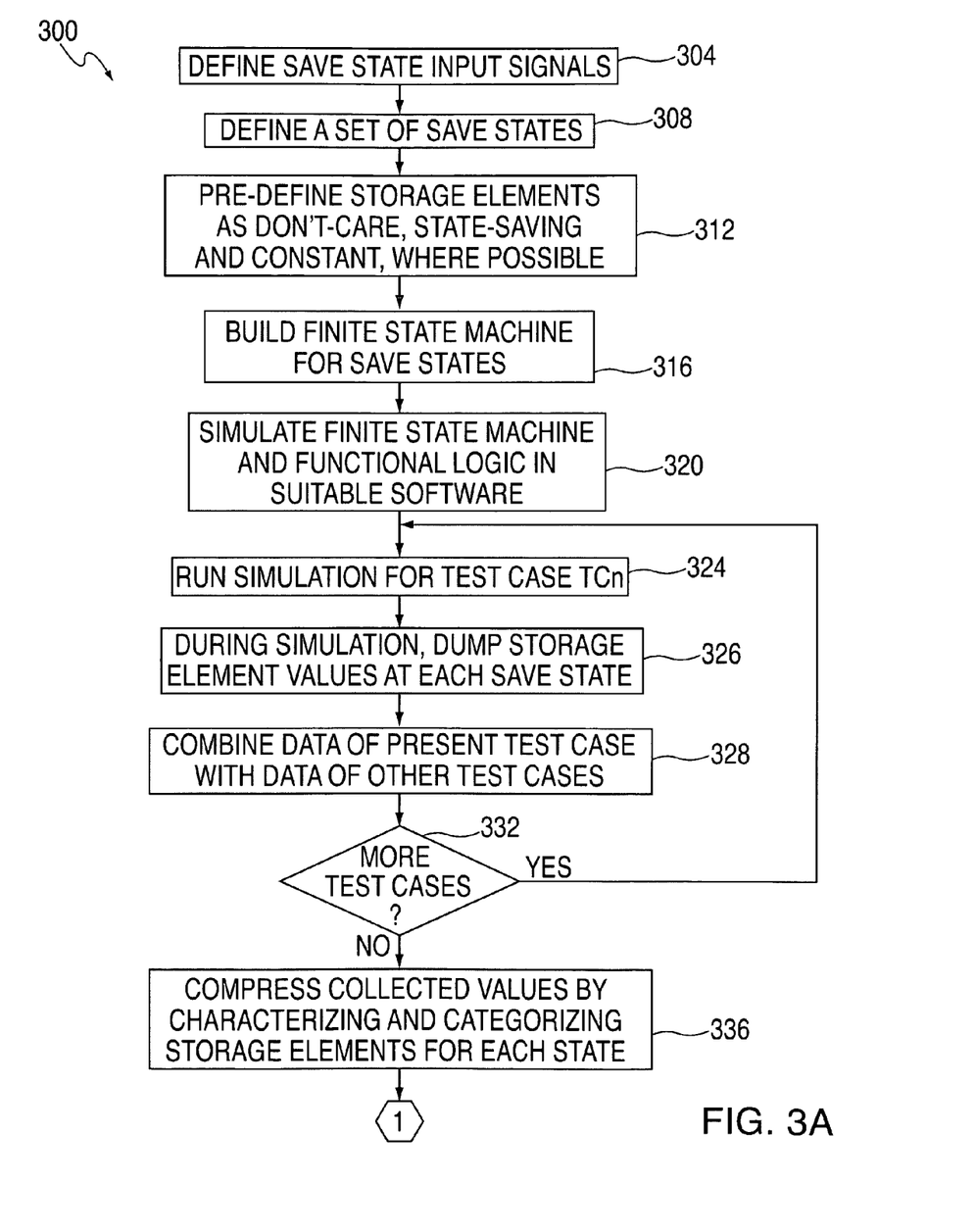
FIGS. 3A-B contain portions of a flow diagram illustrating a method of designing state-restoring circuitry for a power-managed functional block, such as the state-restoring circuitry of FIG. 2.
Figure 3B:
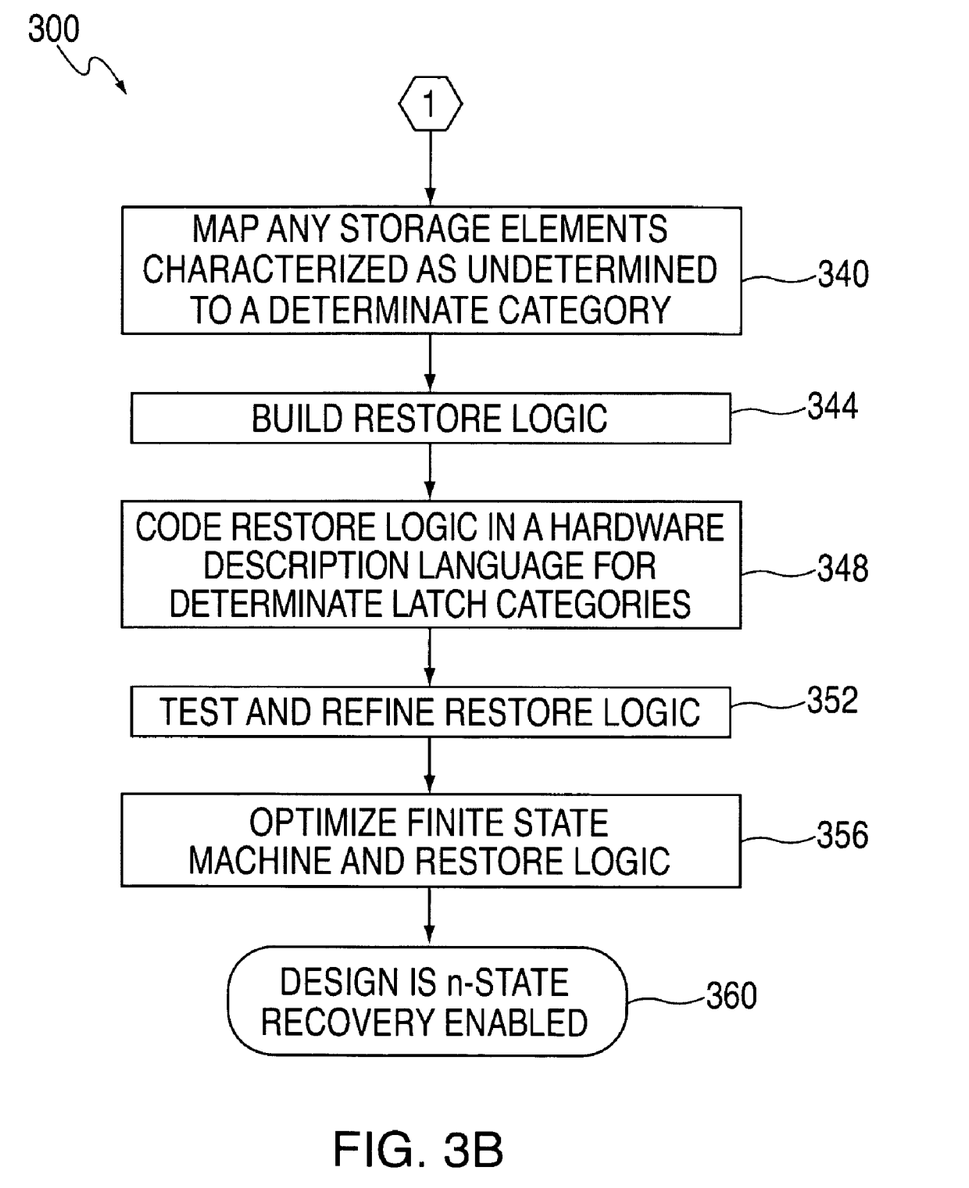

With exemplary multi-state restore circuitry and physical context explained, attention can now be turned to an example of a method of designing multi-state restore circuitry for a power-managed functional block. FIGS. 3A-B illustrate such a method at numeral 300. Referring now to FIGS. 3A-B, and also to FIG. 2A as noted, method 300 may begin at step 304 by defining a set of one or more input signals that a restore-state detector will use to determine which state of a plurality of possible states is to be restored on a particular repowering-up of the functional block at issue. In the context of separately powerable functional block 200 of FIG. 2A, there are six input signals 228A-F that have been defined in accordance with step 304. At step 308, which may be performed in conjunction with step 304, a set of save states is defined. Generally, these are the various states to which the separately powerable functional block can be returned, depending on the states of the input signals. In the case of separately powerable functional block 200 of FIG. 2A, it was noted above that the functional block has six restore states, which are signaled to restore logic 216 over three bit lines 236A-C. It is noted that despite there being six input signals 228A-F and six restore states, this equality is simply coincidental, since there is not necessarily a one-to-one relationship between the number of input signals and the number of restore states.

At step 312, any storage elements (latches) that can be pre-defined as "don't care," "state-saving," or "constant" may be identified. A "constant" storage element is a storage element that contains one or the other of a "0" and "1" regardless of the state to which the functional block is being returned. This step is useful to reduce the number of storage elements that need to be subjected to the test-case simulation and analysis described below and also reduces the amount of multi-state restore circuitry that needs to be provided. If at this point it is unknown as to whether any of the storage elements are definitely any one of the don't care, state-saving, and constant types, such storage elements should be included in the test-case simulation and analysis. In the context of separately powerable functional block 200 of FIG. 2A, any one or more of latches 212A4, 212B2, 212B4 and 212C4 could have been identified as one of the three types at this stage, but they could have been identified as such through the test-case simulation and analysis described below.

At step 316, a finite state machine is built for the subject functional block that indicates the various restore states and the actions that occur among the states. At step 320, the finite state machine built in step 316 is simulated using suitable simulation software. The functional logic of the functional block at issue is also simulated along with the finite state machine. Relative to functional block 200 of FIG. 2A, logic blocks 204, 208 would be simulated in step 320 along with the finite state machine. As described below in detail, this simulation step creates a model for running one or more test cases for the purpose of characterizing the storage elements at issue. In the context of functional block 200 of FIG. 2A, assuming latches 212A4, 212B2, 212B4 and 212C4 were determined in step 312 to be either don't care or state-saving latches, the remaining ones of the latches explicitly shown in FIG. 2, i.e., latches 212A1-3, 212AN, 212B1, 212B3, 212BN, 212C1-3, 212CN, are the latches of interest for simulation.

At step 324, a simulation of finite state machine and functional logic are run for at least one test case for all of the restore states. After the simulation run, the values held in the storage elements of interest at the end of the simulation are dumped at step 326 for each save state. At step 328, the data for this test case, including the dumped values, may be combined with data from other test cases, as appropriate. Tables I and II below illustrate an example in which there are four restore states S1-4 under consideration and seven storage elements, here latches L1-7, of interest.

TABLE I

Test Case 1

| Restore | Contents of Latches L1 through L7 | | | | | | |
|---|---|---|---|---|---|---|---|
| State | L1 | L2 | L3 | L4 | L5 | L6 | L7 |
| S1 | 0 | 1 | 1 | 0 | 1 | 0 | 1 |
| S3 | 0 | 1 | 1 | 1 | 1 | 1 | 1 |
| S2 | 1 | 1 | 0 | 0 | 0 | 0 | 0 |
| S4 | 1 | 1 | 0 | 0 | 1 | 0 | 1 |
| S1 | 0 | 1 | 0 | 0 | 1 | 0 | 1 |

TABLE II

Test Case 2

| Restore | Contents of Latches L1 through L7 | | | | | | |
|---|---|---|---|---|---|---|---|
| State | L1 | L2 | L3 | L4 | L5 | L6 | L7 |
| S1 | 0 | 1 | 1 | 0 | 1 | 0 | 1 |
| S3 | 0 | 1 | 1 | 1 | 1 | 1 | 1 |
| S2 | 1 | 1 | 0 | 0 | 0 | 0 | 0 |
| S4 | 1 | 1 | 0 | 0 | 1 | 0 | 1 |
| S1 | 1 | 1 | 0 | 0 | 1 | 0 | 1 |

At step 332 it is determined whether any more test cases need to be run. If so, steps 324 and 328 are repeated. If at step 332 there are no more test cases to be run, method 300 may proceed to step 336 of compressing the data collected at steps 324 and 328. Table III, below, illustrates a result of compressing the data of Tables I and II for test cases 1 and 2, respectively, into appropriate characterizations. In this example, the following characterizations are used: "R0" (restore a 0); "R1" (restore a 1); "U" (undetermined); "C0" (constant 0 across all states); "C1" (constant 1 across all states); "S" (state-saving); and "D" (don't care). The characterization "U," for "undetermined," is used in cases in which it is indeterminable from the compressed data whether a particular storage element (here, latch) should be of one of the other types, i.e., constant, restore, state-saving, and don't-care.

TABLE III

Compression of Test Cases 1 and 2

| Restore | Characterization of Latches L1 through L7 | | | | | | |
|---|---|---|---|---|---|---|---|
| State | L1 | L2 | L3 | L4 | L5 | L6 | L7 |
| S1 | U | C1 | U | R0 | R1 | R0 | R1 |
| S2 | R1 | C1 | R0 | R0 | U | U | C0 or R0 |
| S3 | R0 | C1 | U | U | U | D | C1 or R1 |
| S4 | R0 | C1 | U | U | D | D | C1 or R1 |

After compressing the test data from the one or more test cases at step 336, at step 340 all storage elements that were characterized as undetermined (U) in step 336, if any, are mapped to an appropriate latch category that can be used in determining the appropriate restore logic (if any) and latch type for each of the latches, as described below. For obvious reasons, the undetermined (U) characterization must be resolved before designing restore logic and assigning actual latch types. Table IV, below, illustrates the latch categories of latches L1-L7 after assigning all latches having the undetermined (U) characterization to appropriate latch categories for each state.

TABLE IV

Latch Categories

| Restore | Categorization of Latches L1 through L7 | | | | | | |
|---|---|---|---|---|---|---|---|
| State | L1 | L2 | L3 | L4 | L5 | L6 | L7 |
| S1 | S | C1 | U | R0 | R1 | R0 | R1 |
| S2 | R1 | C1 | R0 | R0 | D | D | C0 or R0 |
| S3 | R0 | C1 | D | D | D | D | C1 or R1 |
| S4 | R0 | C1 | D | D | D | D | C1 or R1 |

As can be seen from Table IV, all of the undetermined (U) characterizations in Table III have been mapped to the don't-care category, except latch L1 in state 1 (S1), which has been assigned to the state-saving category. These categorizations were made based on the nature of the latches within the functional block. In other designs, the categorizations could be different. For example, all of the undetermined (U) latches could have been assigned to the state-saving (S) category.

After latch categorization at step 340, method 300 may proceed to steps 344 and 348 at which a design for the restore logic, such as restore logic 216 of FIG. 2, is built as a function of the latch categories determined at step 340 and then coded in a suitable hardware description language, such as Verilog, to create a model. At step 352 the model is tested by simulating the test cases used to initially create the restore logic design and model therefor. Testing may proceed, for example, in accordance with the testing method 400 of FIG. 4.

Figure 4:
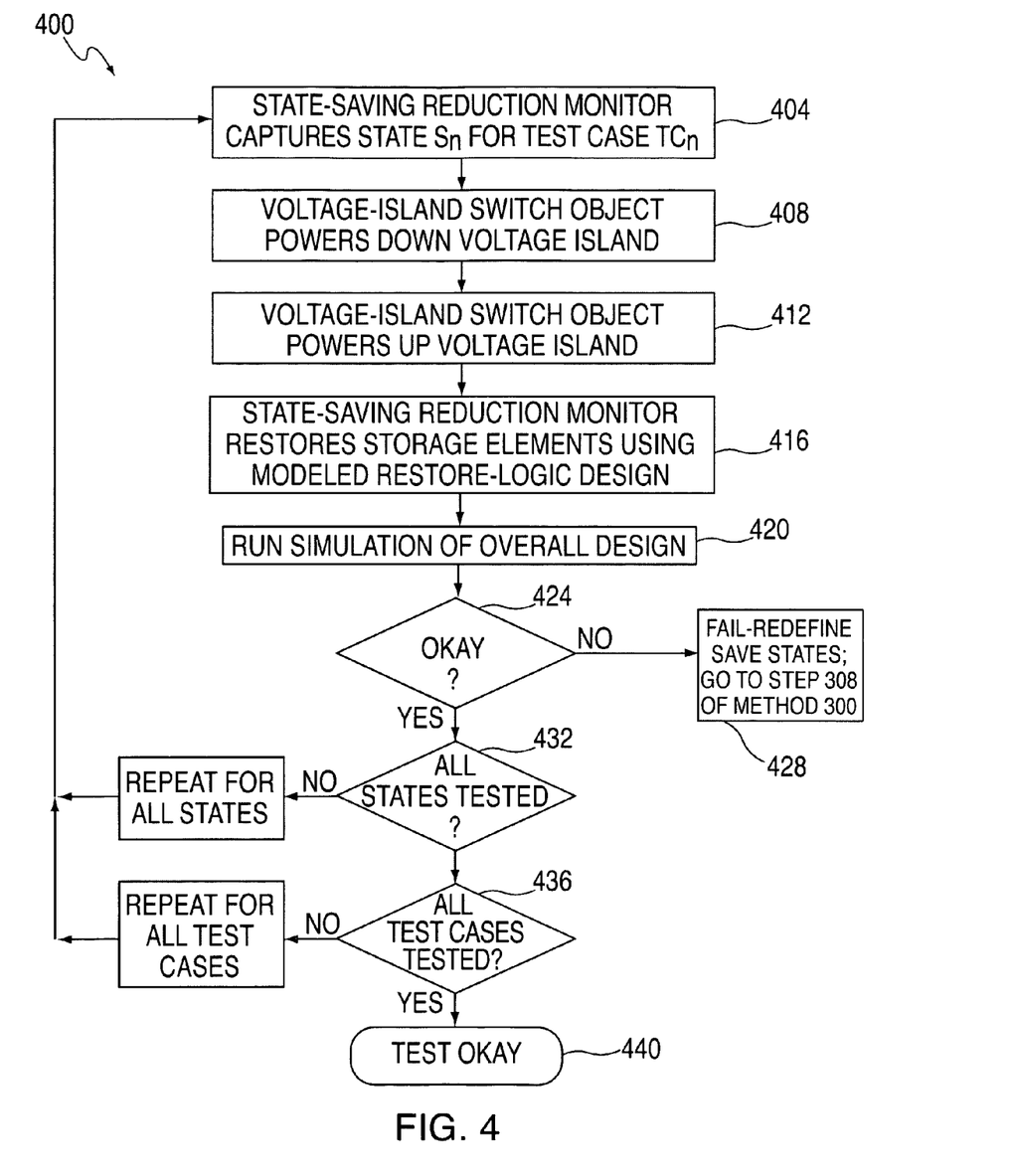
FIG. 4 is a flow diagram for a method of testing state-restoring circuitry designed in accordance with the design methodology described in connection with FIGS. 3A-B.

Referring now to FIG. 4, at step 404 of testing method 400, a state-saving reduction monitor captures state Sn of test case TCn. For example, the first time through this step state S1 of test case TC1 may be captured, the next time through state S2 of test case TC1 may be captured, etc. and then state S1 of test case TC2 may be captured, state S2 of test case S2 may be captured, etc. At step 408 a voltage-island switch object in the model powers down the simulated voltage island and corresponding functional block. In the context of FIG. 2, this voltage island switch object would power down voltage island 224 and separately powerable functional block 200. Then, at step 412, the voltage-island switch object would power-up the voltage island and functional block. Steps 408 and 412 simulate a repowering of the functional block relative to the current state Sn. In response to the repowering up, at step 416 the state-saving reduction monitor restores the latches, by category, using the modeled restore-logic design. At step 420 the simulation of the operation of the overall IC (see, e.g., IC 100 of FIG. 1) is performed to determine whether the IC functions properly with the state restored to the functional block by the restore-logic design.

If at step 424 it is determined that the functioning of the IC using the restored state of the function block is not okay, then method may proceed to step 428 at which the test is labeled as failed and the designer must re-define the save states, for example, by returning to step 308 of method 300 of FIG. 3. However, if it is determined at step 424 that the IC functions properly using the restored state of the functional block, at step 432 it is determined whether or not all states have been tested. If not, method 400 returns to step 404 and tests another one of the remaining states in the current test case. In this example, testing of all states within a test case is done before proceeding to another test case. If it is determined at step 432 that all states Sn of the current test case TCn have been tested, method 400 proceeds to step 436 at which it is determined whether or not all test cases have been tested. If not, method 400 returns to step 404 and tests a state of another one of the remaining test cases. However, if it is determined at step 436 that all test cases have been tested, at step 440 the restore logic design may be labeled as a success.

Referring again to FIG. 3, if the restore logic design tests successfully at step 352, for example using testing method 400 of FIG. 4, at step 356 of method 300 the finite state model and restore logic design may be optimized for implementation in an actual instantiation of the functional block at issue, for example, separately powerable functional block 200 of FIG. 2. Once instantiated, at step 360 the functional block is "n-state-recovery" enabled.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of designing a separately-powerable integrated circuit (IC) functional block, comprising:
   providing an IC logic design that includes a plurality of storage elements;
   determining, by a computer, values held by the plurality of storage elements during a powering-down of the IC logic design so as to obtain determined values;
   characterizing the plurality of storage elements as a function of the determined values; and
   building a restore logic design for restoring state to the plurality of storage elements as a function of the determined values; and
   following said characterizing of the plurality of storage elements, categorizing the plurality of storage elements;
   wherein:
   said categorizing of the plurality of storage elements includes categorizing each of the plurality of storage elements into one or the other of 1) a restore category and 2) a state-saving category; and
   said categorizing of the plurality of storage elements further includes categorizing the plurality of storage elements into a constant category and a don't-care category.

2. The method according to claim 1, wherein said building of said restore logic includes building restore logic cones coupled to the plurality of storage elements.

3. The method according to claim 2, further comprising building a finite state machine for providing logic input to the restore logic cones.

4. The method according to claim 1, further comprising defining a set of restore states for the IC logic design.

5. The method according to claim 4, further comprising building a finite state machine for the set of restore states.

6. The method according to claim 5, further comprising building a model of the finite state machine and IC logic design.

7. The method according to claim 6, wherein said determining of the determined values includes simulating the model for each restore state of the set of restore states.

8. The method according to claim 1, wherein said characterizing of the plurality of storage elements includes characterizing at least one of the plurality of storage elements as being of an undetermined character.

9. The method according to claim 1, further comprising coding the restore logic in a hardware description language (HDL) so as to create an HDL model.

10. The method according to claim 9, further comprising simulating a plurality of test cases using the HDL model.

11. The method according to claim 10, wherein said simulating of the plurality of test cases includes powering-down and then powering-up a voltage island containing a simulation of the IC logic design.

12. A method of designing a separately-powerable integrated circuit (IC) functional block, comprising:
   providing an IC logic design that includes a plurality of storage elements;
   determining, by a computer, values held by the plurality of storage elements during a powering-down of the IC logic design so as to obtain determined values;
   characterizing the plurality of storage elements as a function of the determined values;
   building a restore logic design for restoring state to the plurality of storage elements as a function of the determined values;
   coding the restore logic in a hardware description language (HDL) so as to create an HDL model; and
   simulating a plurality of test cases using the HDL model, wherein said simulating of the plurality of test cases includes powering-down and then powering-up a voltage island containing a simulation of the IC logic design.

13. The method according to claim 12, wherein said building of said restore logic includes building restore logic cones coupled to the plurality of storage elements.

14. The method according to claim 13, further comprising building a finite state machine for providing logic input to the restore logic cones.

15. The method according to claim 12, further comprising defining a set of restore states for the IC logic design.

16. The method according to claim 15, further comprising building a finite state machine for the set of restore states.

17. The method according to claim 16, further comprising building a model of the finite state machine and IC logic design.

18. The method according to claim 12, further comprising, following said characterizing of the plurality of storage elements, categorizing the plurality of storage elements.

19. The method according to claim 18, wherein said categorizing of the plurality of storage elements includes categorizing each of the plurality of storage elements into one or the other of 1) a restore category and 2) a state-saving category.

20. The method according to claim 12, wherein said characterizing of the plurality of storage elements includes characterizing at least one of the plurality of storage elements as being of an undetermined character.

* * * * *